US009660846B2

United States Patent
Ding et al.

(10) Patent No.: US 9,660,846 B2
(45) Date of Patent: May 23, 2017

(54) HIGH-SPEED SERIAL DATA SIGNAL RECEIVER CIRCUITRY

(71) Applicant: Altera Corporation, San Jose, CA (US)

(72) Inventors: Weiqi Ding, Fremont, CA (US);
Mengchi Lui, Fremont, CA (US);
Wilson Wong, San Francisco, CA (US);
Sergey Y. Shumarayev, Los Altos Hills, CA (US)

(73) Assignee: Altera Corporation, San Jose, CA (US)

( * ) Notice: Subject to any disclaimer, the term of this patent is extended or adjusted under 35 U.S.C. 154(b) by 0 days.

(21) Appl. No.: 14/633,080

(22) Filed: Feb. 26, 2015

(65) Prior Publication Data

US 2015/0180683 A1 Jun. 25, 2015

Related U.S. Application Data

(62) Division of application No. 12/002,539, filed on Dec. 17, 2007, now Pat. No. 8,989,214.

(51) Int. Cl.
*H04L 25/03* (2006.01)
*H04L 7/00* (2006.01)

(52) U.S. Cl.
CPC ...... *H04L 25/03878* (2013.01); *H04L 7/0054* (2013.01)

(58) Field of Classification Search
USPC .............................. 375/232, 229, 297, 350
See application file for complete search history.

(56) References Cited

U.S. PATENT DOCUMENTS 4,785,411 A 11/1988 Thompson et al.
4,887,278 A 12/1989 Gupta
(Continued)

FOREIGN PATENT DOCUMENTS

EP 1744510 A2 1/2007
EP 1753142 A2 2/2007
(Continued)

OTHER PUBLICATIONS

Diego Vazquez et al., "A High-Q Bandpass Fully Differential SC Filter with Enhanced Testability," IEEE Journal of Solid-State Circuits, IEEE ServiceCenter, Piscataway, NJ, US vol. 33, No. 7, Jul. 1998.

(Continued)

*Primary Examiner* — Kabir A Timory
(74) *Attorney, Agent, or Firm* — Fletcher Yoder P.C.

(57) ABSTRACT

Circuitry for receiving a high-speed serial data signal (e.g., having a bit rate in the range of about 10 Gpbs and higher) includes a two-stage, continuous-time, linear equalizer having only two serially connected stages. Phase detector circuitry may be provided for receiving the serial output of the equalizer and for converting successive pairs of bits in that output to successive parallel-form bit pairs. Further demultiplexing circuitry may be provided to demultiplex successive groups of the parallel-form bit pairs to final groups of parallel bits, which can be quite large in terms of number of bits (e.g., 64 parallel bits). Another aspect of the invention relates to multiplexer circuitry for efficiently going in the opposite direction from such relatively large groups of parallel data bits to a high-speed serial data output signal.

19 Claims, 3 Drawing Sheets

(56) References Cited

U.S. PATENT DOCUMENTS

| | | | |
|---|---|---|---|
| 5,432,827 A | 7/1995 | Mader | |
| 5,670,916 A | 9/1997 | Korn | |
| 5,710,823 A | 1/1998 | Nagata et al. | |
| 5,726,990 A * | 3/1998 | Shimada | H03M 9/00 327/407 |
| 5,940,441 A | 8/1999 | Cranford, Jr. et al. | |
| 6,184,808 B1 * | 2/2001 | Nakamura | H03M 9/00 341/100 |
| 6,216,148 B1 | 4/2001 | Moran et al. | |
| 6,226,322 B1 | 5/2001 | Mukherjee | |
| 6,366,613 B2 | 4/2002 | Sommer et al. | |
| 6,438,162 B1 | 8/2002 | Boyd et al. | |
| 6,696,995 B1 * | 2/2004 | Foley | H03M 9/00 341/100 |
| 6,741,193 B2 | 5/2004 | Nagata | |
| 7,006,021 B1 * | 2/2006 | Lombaard | H03M 9/00 341/100 |
| 7,015,838 B1 * | 3/2006 | Groen | H03M 9/00 341/100 |
| 7,106,227 B2 | 9/2006 | Karlquist | |
| 7,154,945 B2 | 12/2006 | Guinea et al. | |
| 7,499,489 B1 | 3/2009 | Ellersick et al. | |
| 7,649,409 B1 | 1/2010 | Koh et al. | |
| 7,697,600 B2 | 4/2010 | Maangat et al. | |
| 7,702,011 B2 | 4/2010 | Tran et al. | |
| 7,961,830 B2 | 6/2011 | Okamura et al. | |
| 8,041,233 B2 | 10/2011 | Hueda et al. | |
| 2001/0040921 A1 | 11/2001 | Guinea et al. | |
| 2002/0141515 A1 * | 10/2002 | Enam et al. | 375/340 |
| 2004/0141552 A1 | 7/2004 | Yang et al. | |
| 2005/0135475 A1 * | 6/2005 | Momtaz et al. | 375/240 |
| 2005/0276350 A1 | 12/2005 | Li | |
| 2006/0093075 A1 | 5/2006 | Radich | |
| 2007/0030184 A1 * | 2/2007 | Nguyen et al. | 341/100 |
| 2007/0041455 A1 | 2/2007 | Tran et al. | |
| 2007/0202814 A1 | 8/2007 | Ono et al. | |
| 2008/0056344 A1 | 3/2008 | Hidaka | |
| 2008/0101450 A1 | 5/2008 | Wu et al. | |
| 2009/0022492 A1 * | 1/2009 | Brownlee et al. | 398/43 |

FOREIGN PATENT DOCUMENTS

| | | |
|---|---|---|
| EP | 1753143 A2 | 2/2007 |
| JP | 57-132244 | 6/1982 |
| JP | 09-284246 | 10/1997 |
| JP | 11-117158 | 5/1998 |
| JP | 11017636 | 1/1999 |
| JP | 2003-324405 | 11/2003 |
| JP | 2006-174139 | 6/2006 |
| JP | 2007028625 A | 2/2007 |
| WO | WO-2007/019222 A2 | 2/2007 |

OTHER PUBLICATIONS

"Digital cellular telecommunications system (Phase 2+)," ETSI Standards, European Telecommunications Standards Institute, Sophia-Antipo, FR, vol. 3-G2, No. V420, Jul. 2002.

* cited by examiner

| | | | | |
|---|---|---|---|---|
| 110a : | 0 | 2 | 4 | 6 |
| 110b : | 1 | 3 | 5 | 7 |

| | | | | | | | | |
|---|---|---|---|---|---|---|---|---|
| 120a : | 0 | 8 | 16 | 24 | 32 | 40 | 48 | 56 |
| 120b : | 1 | 9 | 17 | 25 | 33 | 41 | 49 | 57 |
| 120c : | 2 | 10 | 18 | 26 | 34 | 42 | 50 | 58 |
| 120d : | 3 | 11 | 19 | 27 | 35 | 43 | 51 | 59 |
| 120e : | 4 | 12 | 20 | 28 | 36 | 44 | 52 | 60 |
| 120f : | 5 | 13 | 21 | 29 | 37 | 45 | 53 | 61 |
| 120g : | 6 | 14 | 22 | 30 | 38 | 46 | 54 | 62 |
| 120h : | 7 | 15 | 23 | 31 | 39 | 47 | 55 | 63 |

HIGH-SPEED SERIAL DATA SIGNAL RECEIVER CIRCUITRY

CROSS REFERENCE TO RELATED APPLICATION

This applications is a divisional of co-pending U.S. patent application Ser. No. 12/002,539, filed Dec. 17, 2007, which is hereby incorporated by reference in its entirety.

BACKGROUND OF THE INVENTION

This invention relates to integrated circuit devices, and more particularly to circuitry on an integrated circuit that can be used to receive a serial data signal at very high bit rates (e.g., in the range of about 10 gigabits per second (10 Gbps or 10G) and higher).

Industry standards have been developed that call for transmission of serial data signals between relatively closely spaced integrated circuits ("chips") in a system. One typical application is the so-called 10 Gigabit Small Form Factor Pluggable module. The whole module specification for this standard is known as XFP, and the interface specification for this standard is known as XFI. This module supports telecommunication applications such as SONET OC-192 and G.709 "OUT-2", and data communication applications such as 10 Gb/s Ethernet and 10 Gb/s Fibre Channel. The serial link in this standard includes a connector and a pair of printed circuit board ("PCB") traces of less than 200 mm. The channel attenutation is about 6 db at 5.5 GHz. Providing enough equalization and, at the same time, supporting such high data rates (i.e., in the range of about 10 Gbps and higher) in the circuitry that receives such a signal is a very challenging technical task.

Another challenging task is to provide good and efficient conversion of data from the serial form in which it is received from a channel of the type described above to a parallel form in which it can be more easily handled by circuitry downstream from the receiver. A related problem is the reverse process on the transmitter side (i.e., converting parallel data to serial form for extremely high-speed serial output).

SUMMARY OF THE INVENTION

In accordance with one possible aspect of the invention, a high-speed serial data signal (e.g., having a bit rate in the range of about 10 Gbps or higher) is received by two-stage, continuous-time, linear equalizer circuitry having only two serially connected stages. Certain parameters of these stages (e.g., their DC gain, the location in terms of frequency of a frequency response zero, and/or the location in terms of frequency of a frequency response pole) may be variable (e.g., programmably selectable or controllable).

In accordance with another possible aspect of the invention, the equalizer output signal may be processed by half-rate, bang-bang, phase detector circuitry. This phase detector circuitry partly deserializes or demultiplexes the incoming data by converting successive pairs of serial data bits to successive parallel-form bit pairs. Further multi-stage demultiplexer circuitry may be provided for demultiplexing successive groups of the parallel-form bit pairs to successive blocks of much larger numbers of parallel bits (e.g., 64 bits per block).

Still another possible aspect of the invention relates to multi-stage multiplexer circuitry for going in the opposite direction, i.e., converting successive relatively large blocks of parallel data bits to a high-speed serial data bit stream.

Further features of the invention, its nature and various advantages will be more apparent from the accompanying drawings and the following detailed description.

DETAILED DESCRIPTION

Figure 1:
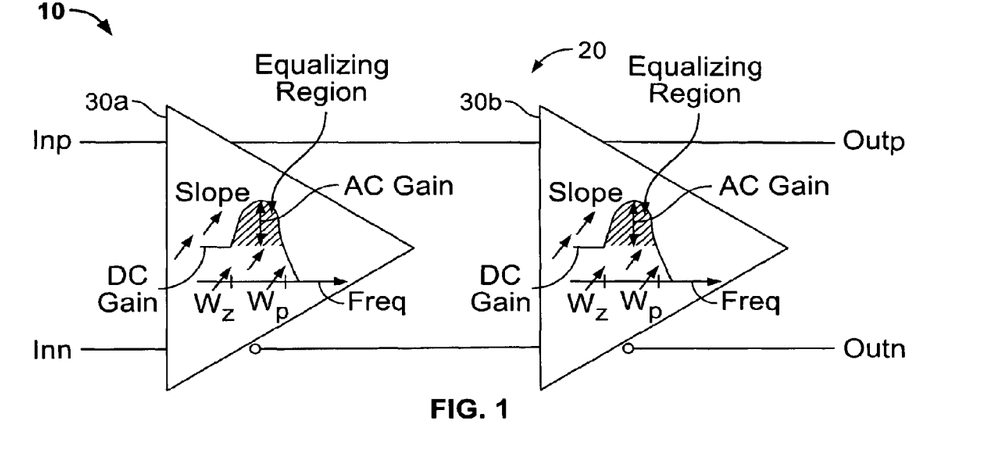
FIG. 1 is a simplified schematic block diagram of illustrative circuitry in accordance with the invention.

An illustrative embodiment of equalizer circuitry 20 for use in high-speed serial data signal receiver circuitry 10 in accordance with the invention is shown in FIG. 1. Again, the 10G receiver equalizer 20 targets chip-to-chip serial link applications such as XFP/XFI. The function of equalizer 20 is to reduce the demands on the phase detector in clock and data recovery ("CDR") circuitry that is also part of receiver 10. The phase detector circuitry (see FIG. 2 for an illustrative embodiment in accordance with the invention) needs to convert the data into digital signal levels without error.

In accordance with the present invention, equalizer 20 is a two-stage, continuous-time, linear (CTL) equalizer. This architecture is relatively simple (i.e., only two stages 30a and 30b), and it has relatively small area and low power consumption. Equalizer 20 has five poles and two zeros. A first pole is at the differential inputs inp and inn to first stage 30a. (Inputs inp and inn are, of course, the high-speed serial data signal that has been received from a transmitting device (another chip, not shown) via a communication link (also not shown).) A second pole is at the differential inputs to second stage 30b. A third pole is at the differential outputs outp and outn of second stage 30b. A fourth pole (the location of which is preferably variable (e.g., programmably variable or selectable)) is Wp of first stage 30a. A fifth pole (the location of which is again preferably variable (e.g., programmably variable or selectable)) is Wp of second stage 30b. A first zero (the location of which is preferably variable (e.g., programmably variable or selectable)) is Wz of first stage 30a. A second zero (the location of which is also preferably variable (e.g., programmably variable or selectable)) is Wz of second stage 30b. ("Location" in the preceding sentences means position of Wp or Wz in terms of frequency along the frequency axes shown in FIG. 1).

In FIG. 1 the symbol for each of stages 30a and 30b contains a diagram showing the (parameterized) frequency response of that stage. The depicted frequency response parameters are DC gain, AC gain, zero location Wz, pole location Wp, and upward slope of the start of the equalizing region (i.e., the region of AC gain between Wz and Wp). In addition to Wz and Wp for each stage 30 being preferably variable, the amount of DC gain of each stage 30 is also preferably variable (e.g., programmably variable or selectable). The slope and AC gain parameters of each stage 30 may not be independently variable, but may depend on other factors such as the position of the zero (Wz) of that stage.

Equalizer 20 has only two stages 30a and 30b because it is intended for operation in a relatively narrow frequency band (e.g., to support narrow-band 10G operation). In the type of chip-to-chip (e.g., XFP/XFI) operation that equalizer 20 is designed to support there is less loss than in other types of applications such as those involving a backplane communication link between the transmitting device and the receiving device. In such backplane applications (which may operate, for example, at 6 Gbps) there can be much greater loss and therefore a need for more than two stages in the receiver equalizer. More than two receiver equalizer stages are undesirable in the type of relatively low-loss, chip-to-chip application of interest in connection with the present invention because more than two equalizer stages tend to amplify noise two much. Overall, equalizer 20 may typically provide up to 6 dB gain boost at 5.5 GHz to compensate for the signal across the channel from the transmitting device (not shown) to receiver 10. Although the intended range of operation of equalizer 20 is (as noted above) relatively narrow around 10 Gbps, the circuitry can also support somewhat higher frequencies (e.g., up to about 11.3 Gbps).

Figure 2:
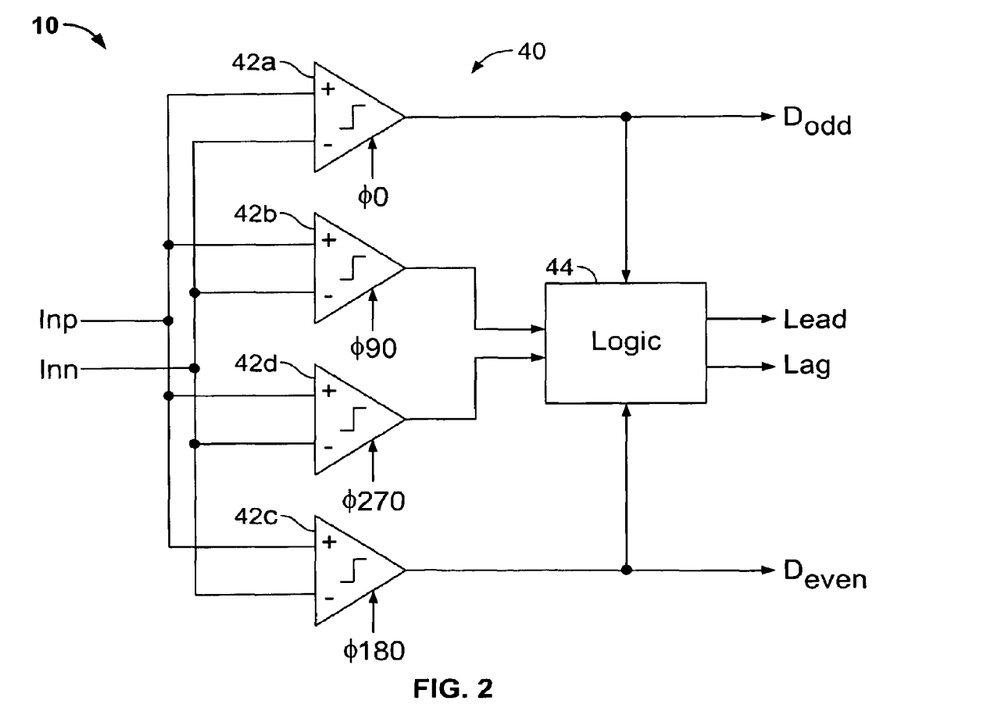
FIG. 2 is a simplified schematic block diagram of further illustrative circuitry in accordance with the invention.

Downstream from equalizer 20 in receiver circuitry 10 is a phase detector, which can be constructed as shown at 40 in FIG. 2 in accordance with further aspects of the invention. The differential input signals inp and inn to phase detector 40 in FIG. 2 are the differential output signals outp and outn in FIG. 1. The phase detector is an important high-speed block in CDR circuitry that forms part of a high-speed serial data signal receiver. Phase detector 40 takes the output from equalizer 20 and coverts it to the binary output (Dodd and Deven). Phase detector 40 also compares the phase differences between (1) a recovered clock signal from a voltage-controlled oscillator ("VCO") in the CDR circuitry and (2) the equalized input data. The detected phase differences (lead and lag) help the VCO to synchronize the embedded clock information in the input data signal.

To accommodate the high data rate, 10G phase detector 40 uses a half-rate, bang-bang structure. This structure includes four, binary, high-speed comparators or samplers 42a-d. Each of samplers 42 is driven by a respective one of four quadrature clocks from the above-mentioned VCO. In particular, sampler 42a is driven by the clock signal having relative phase 0°; sampler 42b is driven by the clock signal having relative phase 90°; sampler 42c is driven by the clock signal having relative phase 270°; and sampler 42d is driven by the clock signal having relative phase 180°. It will thus be seen that the quadrature clock signals have phases that are equally distributed or spaced across one complete clock cycle (360°). Each sampler 42 samples the differential data signals that it receives in synchronism with the rising edge in the clock signal applied to it. If when such a sample is taken by a sampler 42, the plus input to that sampler has higher voltage than the minus input, then the sampler outputs a binary 1 signal. On the other hand, if when such a sample is taken by a sampler 42, the plus input to that sampler has lower voltage than the minus input, then the sampler outputs a binary 0 signal. Note that the frequency of the clock signals is half the serial data rate (i.e., one complete cycle of the clock signals occupies the same amount of time as two successive unit intervals (data bit durations) of the high-speed serial data input signal). Sampler 42a should therefore be sampling near the middle of successive odd-numbered bits in the serial data input signal, while sampler 42c should be sampling near the middle of successive even-numbered bits in the serial data input signal. Sampler 42a should accordingly be able to produce the Dodd output signal (i.e., a binary data output signal indicative of the odd-numbered data bits in the serial data input signal), while sampler 43c should be able to produce the Deven output signal (i.e., a binary data output signal indicative of the even-numbered data bits in the serial data input signal).

Logic block 44 receives the output signals of all four samplers 42a-d to generate signals (lead and lag) indicative of how close to the centers of the odd and even bits samplers 42a and 42c are in fact sampling. For example, if samplers 42a and 42c are sampling earlier than the centers of the odd and even bits, then the outputs of samplers 42a and 42b will always be the same (because both of these samplers are sampling in the same unit interval of the serial data input signal), and the outputs of samplers 42c and 42d will also always be the same. Logic block 44 can detect this condition and can output a pulse on its "lead" output lead to indicate that the VCO clock signals are leading the phase that they should have for optimal sampling of the serial data input signal. Such a "lead" output pulse can be used to cause the VCO to slow down slightly in terms of frequency to improve the phasing of the quadrature clock signals produced by the VCO. Conversely, if samplers 42a and 42c are sampling the serial data input signal later than the centers of data bits in that signal, then the outputs of samplers 42a and 42b will frequently be different from one another (because these two samplers are sampling in two successive unit intervals in the incoming serial data signal), but the outputs of samplers 42b and 42c will always be the same. Similar behavior will be found in comparisons of the outputs of samplers 42c and 42d (frequently different) and 42d and 42a (always the same). Logic block 44 can detect this condition and can output a pulse on its "lag" output lead to indicate that the VCO clock signals are lagging the phase that they should have for optimal sampling of the serial data signal. Such a "lag" output pulse can be used to cause the VCO to speed up slightly in terms of frequency to improve the phasing of the quadrature clock signals produced by the VCO.

Like equalizer 20, the intended range of operation of phase detector 40 is around 10 Gbps, but it can also support somewhat higher frequencies (e.g., up to about 11.3 Gbps).

Each high-speed comparator 42 in phase detector 40 preferably has built-in offset cancellation circuitry. This offset cancellation circuitry may be set by means of a calibration operation that is performed prior to normal operation of the circuitry to process an actual serial data signal. This calibration operation preferably gives each comparator 42 a threshold of 0 volts. Thereafter, each comparator looks for a positive difference between the plus and minus inputs to that comparator, and produces a binary 1 output when that difference is positive (i.e., greater than the 0 volt threshold that has been established for that comparator).

Recapitulating some of the benefits and advantages of the foregoing, programmable zeros Wz in the receiver equalizer 20 boost the receiver gain up to about 6 dB at 5.5 GHz. The CTL equalizer structure 20 has low power and small area. Both the equalizer 20 and the phase detector 40 support data rates up to about 11.3 Gbps. Offset cancellation within phase detector 40 increases the 10G receiver input sensitivity.

We turn now to possible de-serializer (and converse serializer) aspects of the invention.

As has been mentioned, 10 Gbps electrical high-speed serial ("HSS") transceivers are desired in many applications such as OC192SONET/SDH, 10 Gbit Ethernet, Optical Transport Networks, and/or systems with forward error correction, etc. While the HSS link (e.g., as shown in FIGS. 1 and 2 herein) provides very high throughputs at the chip pin point, other circuitry that needs to use (or supply) these signals (e.g., the remaining circuitry of a programmable microcontroller, a field-programmable gate array ("FPGA"), or core logic of some other type of integrated circuit device that includes the HSS circuitry) may still process data in parallel at lower clock rates for better signal integrity and time margin. Thus the HSS receiver like 10 herein (or a comparable HSS transmitter like that shown, for example, in Wong et al. U.S. patent application Ser. No. 12/002,540) filed Dec. 17, 2007 needs to convert the serial data to parallel data (or to do the opposite on the transmitter side). The present disclosure provides 1:64 deserializer circuitry and 64:1 serializer circuitry that can be used for these purposes.

Figure 3:
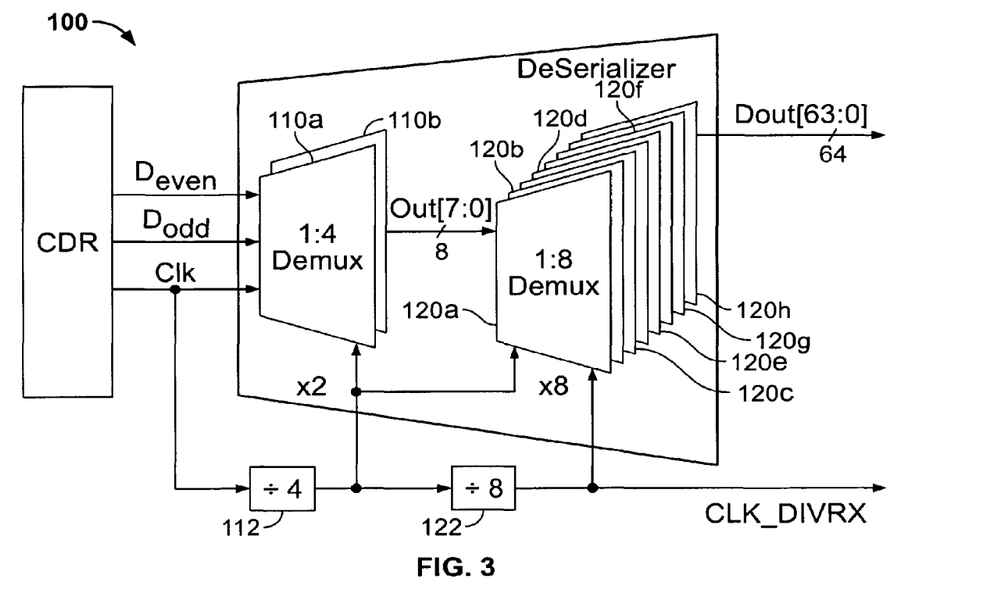
FIG. 3 is a simplified schematic block diagram of still further illustrative circuitry in accordance with the invention.

An illustrative embodiment of deserializer circuitry 100 in accordance with the invention is shown in FIG. 3. This circuitry has a first stage that includes two 1:4 demultiplexers 110a and 110b, and a second stage that includes eight 1:8 demultiplexers 120a-h. Demultiplexer 110a receives the Deven output signal of circuitry 40. In parallel with this, demultiplexer 110b receives the Dodd output signal of circuitry 40. Demultiplexers 110a-b also receive a half-rate clock signal having (1) the same frequency as any of the phase 0 to phase 270 signals in FIG. 2, and (2) phase that is appropriate for allowing demultiplexers 110a-110b to latch in successive pairs of valid Deven and Dodd signals as will be described in more detail below. The output side of this first stage of the deserializer is clocked by a clock signal having frequency divided by 4 (by frequency divider 112) from the half-rate frequency used to clock in the input side of this deserializer stage.

Demultiplexers 110a-b produce eight parallel output signals, each of which is applied to a respective one of the eight demultiplexers 120a-h. The input side of demultiplexers 120a-h is clocked by a signal having the same frequency as is used to clock the output side of demultiplexers 110a-b. Demultiplexers 120a-h eventually accumulate 64 bits of valid data and output that data in parallel on the Dout leads. The output side of this second stage of the deserializer is clocked by a clock signal having frequency divided by 8 (by frequency divider 122) from the frequency used to clock the input side of this deserializer stage. This clock signal (CLK_DIVRX) can also be applied to downstream circuitry to allow that circuitry to latch in valid Dout signals.

Figure 4:
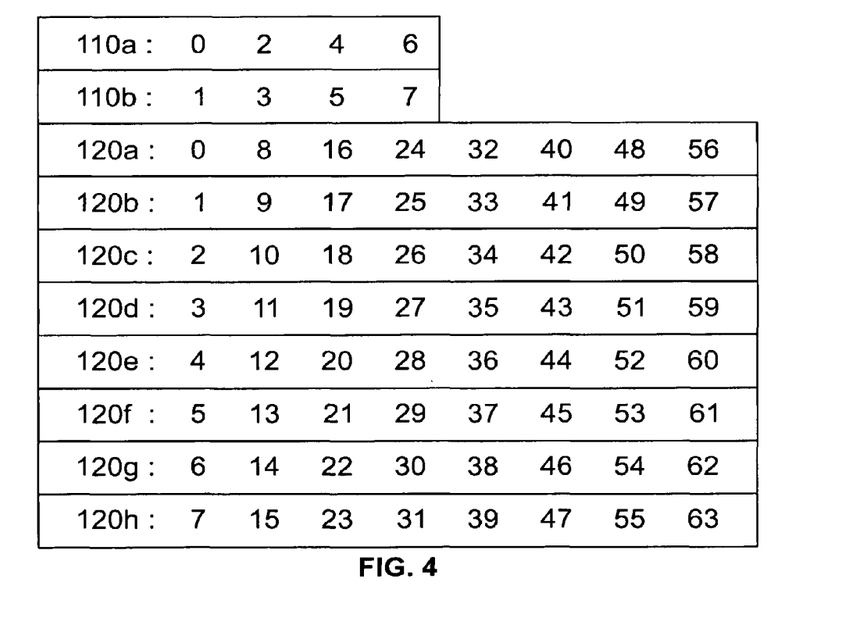
FIG. 4 is a simplified diagram that illustrates the flow of some representative data through the FIG. 3 circuitry.

FIG. 4 illustrates how data may flow through demultiplexers 110a-b and 120a-h. In a first period of a half-rate clock (i.e., half the incoming serial bit rate), the first two serial bits to arrive (arbitrarily referred to as bits 0 and 1) are stored in demultiplexers 110a and 110b, respectively. In a second period of the above-mentioned half-rate clock, the next two serial bits to arrive (i.e., bits 2 and 3) are stored in demultiplexers 110a and 110b, respectively. In a third period of the half-rate clock, the next two bits to arrive serially (i.e., bits 4 and 5) are added to what is stored in demultiplexers 110a and 110b, respectively. In a fourth half-rate clock period, bits 6 and 7 are added to what is stored in demultiplexers 110a and 110b, respectively. The contents of demultiplexers 110 are then transferred to demultiplexers 120a-h. In particular, bit 0 is transferred from demultiplexer 110a to demultiplexer 120a, where bit 0 is now stored; bit 1 goes from demultiplexer 110b to demultiplexer 120b, where bit 1 is now stored; bit 2 goes from 110a to 120c, where bit 2 is now stored; bit 3 goes from 110b to 120d, where bit 3 is now stored; and so on. In successive periods of the half-rate clock, multiplexers 110a and b are again filled with data from circuitry 40. Then this data is again transferred to demultiplexers 120a-h so that 120a stores bits 0 and 8, 120b stores bits 1 and 9, 120c stores bits 2 and 10, 120d stores bits 3 and 11, and so on.

The above-described process continues until demultiplexers 120a-h are full (e.g., 120a contains bits 0, 8, 16, 24, 32, 40, 48, and 56). All eight of demultiplexers 120a-h then output all of their data in parallel on leads Dout. This parallel data can go to downstream circuitry which can process it at much lower data rates than the serial data rate. For example, this downstream circuitry can process this parallel data using a parallel data clock (like CLK_DIVRX) that is one-sixty-fourth (1/64) the incoming serial bit rate. This greatly facilitates the design, construction, and operation of the downstream circuitry (sometimes referred to as utilization circuitry).

It will be noted that even within demultiplexer 100, the construction of that circuitry helps it operate at clock signal frequencies that are lower than the serial bit rate. For example, each of demultiplexers 110a and 110b only has to receive data at one-half the serial bit rate. This is so because upstream circuitry 40 already puts two serially received bits in parallel (effectively cutting the data rate to one-half the serial bit rate). Demultiplexers 110a and 110b collectively output eight bits in parallel. Therefore their output data rate (and the input data rate of demultiplexers 120a-h) is one-eighth the serial bit rate. And of course the output data rate of demultiplexers 120a-h is one-sixty-fourth the serial bit rate.

Figure 5:
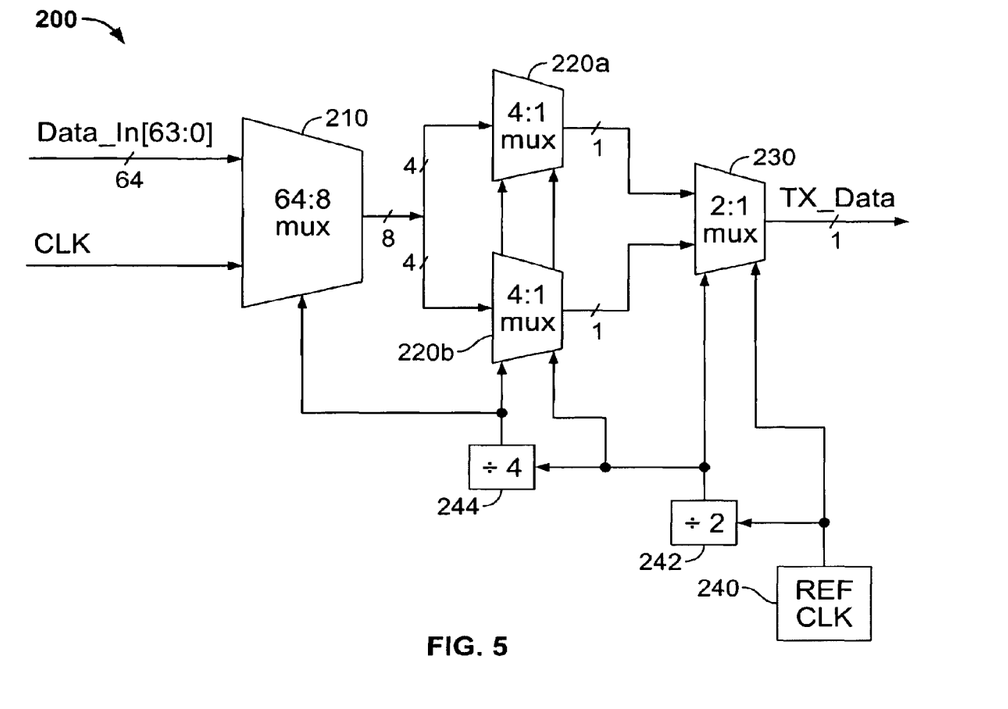
FIG. 5 is a simplified schematic block diagram of still more illustrative circuitry in accordance with the invention.

Illustrative multiplexer circuitry 200 in accordance with another possible aspect of the invention is shown in FIG. 5. The circuitry upstream from this circuitry can be part of the circuitry that is downstream from the circuitry shown in FIG. 3 herein. The circuitry downstream from the FIG. 5 circuitry can be transmitter driver circuitry (e.g., like that shown in the above-mentioned Wong et al. reference).

Multiplexer 210 can receive 64 bits of data in parallel via the DATA_IN[63:0] leads. Multiplexer 210 also receives a clock signal having frequency and phase that allows multiplexer 210 to latch each successive block of 64 valid data bits that it receives.

Multiplexer 210 outputs the 64 data bits that it has received in eight blocks of eight parallel bits each. For example, if the bits that multiplexer 210 has received are arbitrarily numbered 0-63, then bits 0-7 are output first; then bits 8-15 are output;
then bits 16-23 are output; and so on. These 8-bit blocks are output at eight times the frequency that the 64-bit blocks are applied to multiplexer 210.

The even-numbered bits in each 8-bit block output by multiplexer 210 are all applied in parallel to multiplexer 220a. The odd-numbered bits in each such 8-bit block are all applied in parallel to multiplexer 220b. Thus, for example, from the 8-bit block that includes bits 0-7, bits 0, 2, 4, and 6 are all applied to multiplexer 220a, and bits 1, 3, 5, and 7 are all applied to multiplexer 220b.

Each of multiplexers 220a and 220b outputs the four bits that it receives in parallel one after another in series. Note, however that the two series output by multiplexers 220a and 220b are synchronized with one another so that they collectively constitute two data streams that are in parallel with one another. These two data streams are applied in parallel to the input side of multiplexer 230. Because the successive outputs of multiplexer 220a are all even bits, while the successive outputs of multiplexer 220b are all odd bits, multiplexer 230 receives one even bit and one odd bit in each cycle of operation of its input side.

Multiplexer 230 outputs each pair of bits (which it has received in parallel) one after another in series. Accordingly, multiplexer 230 produces the final serial data output stream TX_DATA.

Clocking of the output side of multiplexer 230 is typically at the serial bit rate (e.g., about 10 Gbps or higher). Clocking of the input side of multiplexer 230 (and the output side of multiplexers 220) can be at one-half the serial bit rate. Clocking of the input side of multiplexers 220 (and the output side of multiplexer 210) can be at one-eighth the serial bit rate. Clocking of the input side of multiplexer 210 can be at one-sixty-fourth the serial bit rate. Some or all of the necessary clock signals can be provided by appropriate multiplication of the frequency of the CLK input to multiplexer 200. Alternatively or in addition, some or all of the necessary clock signals can be provided by appropriately dividing the frequency of a serial bit rate clock signal (e.g., supplied from a reference clock signal source 240). For completeness, an example in which all of the clock signals (except for the input side of mux 210) are provided from such a high-speed reference clock signal source 240 is shown in FIG. 5. In this example, source 240 clocks the output side of mux 230. Frequency divider 242 divides the reference clock frequency by 2 to clock the input side of mux 230 and the output side of muxes 220. Frequency divider 244 divides the element 242 output frequency by 4 to clock the input side of muxes 220 and the output side of mux 210.

Note that the multiplexer structure shown in FIG. 5 allows the upstream circuitry to operate at relatively low clock rates (e.g., one-sixty-fourth the serial output bit rate). The FIG. 5 circuitry can accept this data at such a relatively low clock rate, and can then convert it to serial data having a very high serial data rate. In addition, the FIG. 5 circuitry has the advantage of not needing to work with the very high serial data rate until the final, relatively small 2:1 multiplexer 230 is reached. Only the output side of this relatively small multiplexer 230 has to operate at the very high serial bit rate. The input side of mux 230 operates at one-half the serial bit rate, and the upstream stages of multiplexer 200 operate at that reduced rate or even further reduced rates. Another advantage of the circuitry of FIG. 5 is that two 4:1 muxes 220a and 220b are provided and operate in parallel. The input clocking and phasing of both of these components 220 can be the same. The output clocking and phasing of both of these components can also be the same. In addition, the output clocking of these relatively large (as compared to mux 230) multiplexers 220 can be at lower frequency than the final serial output data bit rate.

Figure 6:
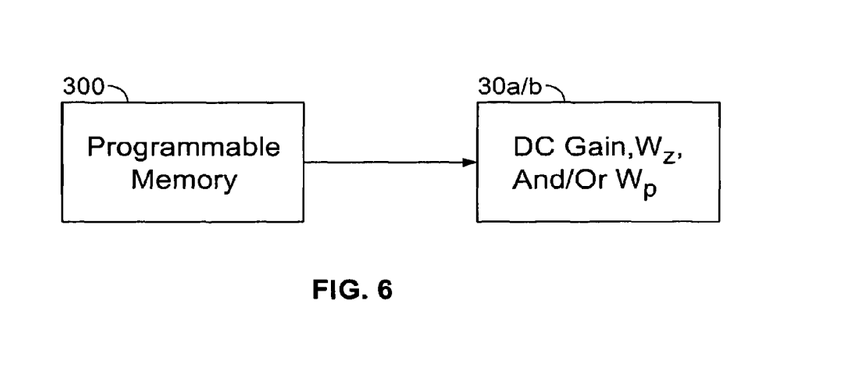
FIG. 6 is a simplified schematic block diagram providing additional detail as to how certain aspects of the FIG. 1 circuitry may be constructed.

FIG. 6 recapitulates, amplifies, and depicts the point made earlier that the values of variable parameters of equalizer stage 30a and/or 30b (e.g., the DC gain, the location in frequency of the variable zero Wz, and/or the location in frequency of the variable pole Wp of either or both of those stages) can be programmably controlled. Thus FIG. 6 shows that any or all of these parameters can be controlled by programmable memory 300, which can be part of the integrated circuit device that includes the other circuitry such as 10 that is shown and described herein. For example, this integrated circuit may be or may include programmable circuitry such as a programmable microcontroller, a programmable logic device ("PLD"), etc. In such cases, memory 300 may be part of the programmable configuration memory of the programmable integrated circuit device.

It will be understood that the foregoing is only illustrative of the principles of the invention, and that various modifications can be made by those skilled in the art without departing from the scope and spirit of the invention.

What is claimed is:

1. Multiplexer circuitry for converting successive blocks of data bits to a serial data output signal, the multiplexer circuitry comprising:

first multiplexer circuitry comprising a first multiplexer for converting each of the successive blocks of data bits latched by an input clock signal to a succession of first intermediate blocks, each of which includes a first subplurality of data bits from one of the blocks of data bits that is currently being processed, wherein the first multiplexer circuitry receives the successive blocks of data bits, and provides the first subplurality of the data bits in parallel, and wherein the first multiplexer receives a first clock signal and has a first size;

second multiplexer circuitry for converting each of the successive first intermediate blocks into a succession of second intermediate blocks, each of which includes a second subplurality of data bits from one of the first intermediate blocks that is currently being processed, wherein the second multiplexer circuitry comprises a second multiplexer and a third multiplexer, each having a size smaller than the first size; and third multiplexer circuitry for converting each of the second intermediate blocks into a succession of individual bits.

2. The circuitry defined in claim 1 wherein the second multiplexer receives only even-numbered bits from the first multiplexer circuitry, and the third multiplexer receives only odd-numbered bits from the first multiplexer circuitry.

3. The circuitry defined in claim 2 wherein the second multiplexer and the third multiplexer operate in tandem to simultaneously output one even-numbered bit and one odd-numbered bit for application in parallel to the third multiplexer circuitry.

4. The circuitry defined in claim 1, wherein the second multiplexer receives a first portion of the first subplurality of the data bits in parallel, the first portion comprising at least two bits, and when the second multiplexer receives the first portion, the third multiplexer receives a second portion of the first subplurality of the data bits in parallel, the second portion comprising at least two bits.

5. The circuitry defined in claim 1, wherein:

the first multiplexer circuitry outputs the succession of first intermediate blocks at a first clock rate of the first clock signal higher than the input clock rate of the input clock signal;

the second multiplexer circuitry receives the first intermediate blocks at the first clock rate and provides the succession of second intermediate blocks at a second clock rate or a second clock signal higher than the first clock rate; and the third multiplexer circuitry receives the second intermediate blocks at the third clock rate and provides the succession of individual bits at a third clock rate of a third clock signal higher than the second clock rate.

6. Demultiplexer circuitry for converting a serial data input signal comprising a plurality of pairs of bits into parallel data signal, the demultiplexer circuitry comprising:

first demultiplexer circuitry that converts the plurality of pairs of bits to intermediate blocks of parallel-form data bits, the first demultiplexer circuitry comprising:

a first demultiplexer that receives a first bit of a first pair of bits of the plurality of pairs of bits, an input clock signal that latches the first bit in an input of the first demultiplexer, and a first clock signal that clocks an output of the first demultiplexer; and a second demultiplexer that receives a second bit of the first pair of bits of the plurality of pairs of bits, the input clock signal that latches the second bit in an input of the second demultiplexer, and the first clock signal that clocks an output of the second demultiplexer; and second demultiplexer circuitry that converts the intermediate blocks of parallel-form data bits to successive final groups of parallel data bits, each of the final groups of parallel data bits including a multiple number of the intermediate blocks of parallel-form data bits, the second demultiplexer circuitry comprising a set of additional demultiplexers.

7. The circuitry defined in claim 6, wherein the first demultiplexer and the second demultiplexer operate in parallel to receive the first bit and the second bit of a pair of bits in a single cycle of the input clock signal.

8. The circuitry defined in claim 7, wherein:
the first demultiplexer provides, in parallel, a first portion of each intermediate block of parallel-form data bits, the first portion including at least two bits; and
when the first demultiplexer provides the first portion, the second demultiplexer provides a second portion of each intermediate block of parallel-form data bits in parallel with the first portion, the second portion including at least two bits.

9. The circuitry defined in claim 7, wherein:
the first demultiplexer circuitry provides the intermediate blocks of parallel-form data bit clocked with the first clock signal; and
the second demultiplexer circuitry latches the intermediate blocks of parallel-form data bits by the first clock signal and provides the successive final groups of parallel data bits clocked with a second clock signal having a second clock rate lower than a first clock rate of the first clock signal.

10. The circuitry defined in claim 6, wherein the second demultiplexer circuitry provides the successive final groups of parallel data bits to a multiplexer circuitry for converting the successive final groups of parallel data bits to a serial data output signal, and the multiplexer circuitry comprises:
first multiplexer circuitry for converting each of the successive final groups of parallel data bits to a succession of first intermediate blocks, each of which includes a first subplurality of data bits from one of the successive final groups of parallel data bits that is currently being processed;
second multiplexer circuitry for converting each of the first intermediate blocks into a succession of second intermediate blocks, each of which includes a second subplurality of data bits from one of the first intermediate blocks that is currently being processed; and
third multiplexer circuitry for converting each of the second intermediate blocks into a succession of individual bits.

11. A method of converting successive blocks of parallel data bits to a serial data output signal, the method comprising:
using a first multiplexer having a first size to convert each of the successive blocks of parallel data bits latched to the first multiplexer with an input clock signal, into a succession of first intermediate blocks of parallel data bits based on a first clock signal, each first intermediate block of parallel data bits including a first subplurality of parallel data bits from one of the successive blocks of parallel data bits that is currently being processed;
using second and third multiplexers, each having a second size smaller than the first size, to convert each of the first intermediate blocks into a succession of second intermediate blocks of parallel data bits, each second intermediate block of parallel data bits including a second subplurality of parallel data bits from one of the first intermediate blocks of parallel data bits that is currently being processed; and
using a fourth multiplexer to convert each of the second intermediate blocks of parallel data bits into a succession of individual bits.

12. The method defined in claim 11, wherein the second multiplexer receives only even-numbered bits from the first multiplexer, and the third multiplexer receives only odd-numbered bits from the first multiplexer.

13. The method defined in claim 12, wherein the second and third multiplexers operate in tandem to simultaneously output one even-numbered bit and one odd-numbered bit for application in parallel to the fourth multiplexer.

14. The method defined in claim 11, wherein:
the first multiplexer provides the succession of first intermediate blocks of parallel data bits clocked with the first clock signal, wherein the first clock signal has a higher rate than the input clock signal;
the second and third multiplexers latches the first intermediate blocks of parallel data bits using the first clock signal and provide the succession of second intermediate blocks of parallel data bits clocked with a second clock signal, wherein the second clock signal has a higher rate than the first clock signal; and
the fourth multiplexer latches the second intermediate blocks of parallel data bits using the second clock signal and provides the succession of individual bits clocked with a third clock signal, wherein the third clock signal has a higher rate than the second clock signal.

15. A method of converting a serial data input signal to successive blocks of parallel data bits, the method comprising:
receiving an input clock signal and successive parallel-form bit pairs, wherein each first and second bit of the pair of bits is latched based on a phase of a cycle of the input clock signal;
converting successive groups of the parallel-form bit pairs to successive intermediate blocks of parallel data bits using first and second demultiplexers having a first size and providing the successive intermediate blocks of parallel data bits clocked with a first clock signal, each of the successive intermediate blocks of parallel data bits including a plural number of the successive parallel-form bit pairs; and
converting successive groups of the successive intermediate blocks of parallel data bits to successive final groups of parallel data bits using a set of additional demultiplexers having a second size larger than the first size, each of the final groups of parallel data bits including a multiple number of the successive intermediate blocks of parallel data bits.

16. The method defined in claim 15 wherein the first demultiplexer receives the first bit in each of the successive groups of the parallel-form bit pairs, and the second demultiplexer receives the second bit in each of the successive groups of the parallel-form bit pairs.

17. The method defined in claim 16, wherein the first and second demultiplexers operate in parallel to simultaneously receive the first bit and the second bit.

18. The method defined in claim 17, wherein:
the first demultiplexer provides, in parallel, a first portion of each successive intermediate block of parallel data bits, the first portion including at least two bits; and
when the first demultiplexer provides the first portion, the second demultiplexer provides a second portion of each successive intermediate block in parallel with the corresponding first portion, the second portion including at least two bits.

19. The method defined in claim 15, wherein:
a first clock rate of the first clock signal is higher than a clock rate of the input clock signal; and
the additional demultiplexers latch the successive groups of the intermediate blocks of parallel data bits using the first clock signal and provide the successive final groups of parallel data bits clocked with a second clock signal having a second clock rate lower than the first clock rate.

\* \* \* \* \*